Figure 1:
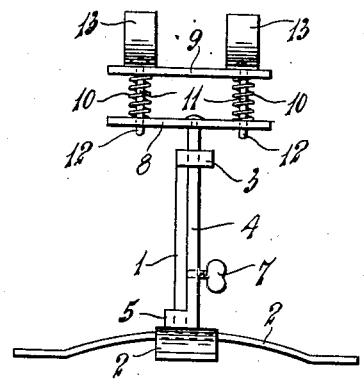

S. B. SIFLEET.
MILK CLAW SUPPORT.
APPLICATION FILED OCT. 1, 1917.

1,336,593.

Patented Apr. 13, 1920.

Stephen Benjamin Sifleet
Inventor
By Albert W. Parker
Attorney

UNITED STATES PATENT OFFICE.

STEPHEN BENJAMIN SIFLEET, OF PIRONGIA, WAIKATO, NEW ZEALAND.

MILK-CLAW SUPPORT.

1,336,593.      Specification of Letters Patent.     Patented Apr. 13, 1920.

Application filed October 1, 1917. Serial No. 194,135.

*To all whom it may concern:*

Be it known that I, STEPHEN BENJAMIN SIFLEET, a citizen of the Dominion of New Zealand, and residing at Pirongia, Waikato, in the Provincial District of Auckland, in the Dominion of New Zealand, have invented certain new and useful Improvements in Milk-Claw Supports, of which the following is a specification.

This invention provides a support for carrying the milk claw of a milking apparatus, whereby the teats of a cow are relieved from the weight of the claw and its attachments, the annoyance and delay, which frequently arise from the teat cups falling off the teats as hitherto used, being thereby avoided.

The invention comprises a standard fixed to feet, so that it will stand erect, a rod slidable on the standard and adapted to be fixed at any desired height thereon, a crosshead fixed to the end of the rod, a plate provided with stems slidable in holes made in the cross-head, springs located on the stems and between the plates and the crosshead, and horns fixed to the plate.

The standard has a socket through which the rod is slidable, and the rod has a socket slidable on the standard. The rod is locked upon the standard by a set screw.

The drawing herewith illustrates the invention and will now be referred to for the purpose of a detailed description:—

Figure 2:
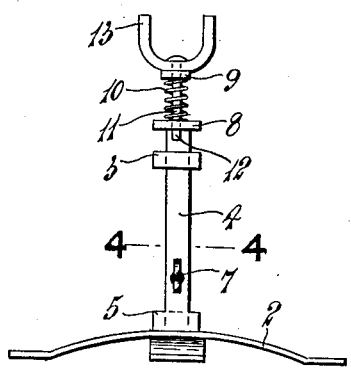

Figure 1, is a side elevation,

Fig. 2, an end elevation, and

Figure 3:
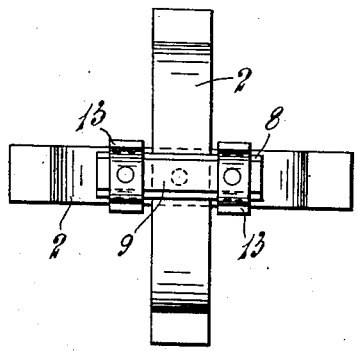
Figure 4:
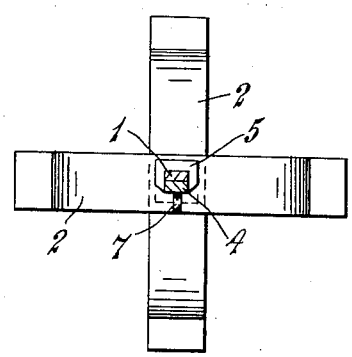

Fig. 3, a plan of the standard,

Fig. 4, is a sectional plan on line 4—4 of Fig. 2.

The standard 1 is fixed to feet 2 and at the top has a socket 3, through which the rod 4 is slidable. A socket 5 on the bottom of the rod 4 is slidable on the standard 1. The rod 4 can be locked at any desired height upon the standard 1 by the screw 7. The crosshead 8 is fixed to the rod 4, and upon the crosshead the plate 9 is supported by springs 10, which are located on stems 11 fixed to the plate 9 and slidable in holes made in the crosshead. The stems are prevented from being entirely withdrawn from the crosshead by pins 12. Horns or U shaped brackets 13 are fixed to, and project upwardly from the plate 9.

In use the support stands upon the ground immediately below the udder of the cow, and the rod 4 is adjusted to suit the height of the udder from the ground. The springs 10 allow the claw to yield to the pulsations of the milking machine.

What I do claim and desire to secure by Letters Patent of the United States is:—

1. Milk claw support, comprising a standard, a rod adjustable thereon, supporting means carried by said rod at the upper end thereof, a plate supported by said means for vertical movement relatively thereto, yielding means between said supporting means and said plate resisting the downward movement of the latter, and horns projecting upwardly from said plate.

2. Milk claw support, comprising a standard and a rod adapted to be locked at any desired height thereon, a crosshead on the rod, a plate having stems slidable in holes made in the crosshead, springs between the crosshead and plate and located on the stems, and horns projecting upwardly from the plate, substantially as set forth.

3. Milk claw support, comprising a standard having feet at its lower end and a socket at its upper end, a rod slidable in the socket, and having at its lower end a socket slidable on the standard, a screw for locking the rod at any desired height upon the standard, supporting means carried by said rod at the upper end thereof, a plate supported by said means for vertical movement relatively thereto, yielding means between said supporting means and said plate resisting the downward movement of the latter, and horns projecting upwardly from said plate.

In testimony whereof I have signed my name to this specification in the presence of two witnesses.

STEPHEN BENJAMIN SIFLEET.

Witnesses:
E. A. MCCONNELL,
J. G. SCOTT SMITH.